(12) United States Patent  
Herzig

(10) Patent No.: US 7,842,773 B2
(45) Date of Patent: Nov. 30, 2010

(54) PROCESS FOR THE PREPARATION OF ORGANOSILICON COMPOUNDS HAVING URETHANE GROUPS

(75) Inventor: Christian Herzig, Waging am See (DE)

(73) Assignee: Wacker Chemie AG, Munich (DE)

( * ) Notice: Subject to any disclaimer, the term of this patent is extended or adjusted under 35 U.S.C. 154(b) by 835 days.

(21) Appl. No.: 11/743,691

(22) Filed: May 3, 2007

(65) Prior Publication Data

US 2007/0260010 A1 Nov. 8, 2007

(30) Foreign Application Priority Data

May 4, 2006 (DE) .................... 10 2006 020 818
May 4, 2006 (DE) .................... 10 2006 020 819

(51) Int. Cl.
*C08G 77/26* (2006.01)

(52) U.S. Cl. ............................. 528/27; 528/25; 528/26; 528/38; 528/34; 524/588; 524/838

(58) Field of Classification Search .................. 528/25, 528/26, 27, 38, 34; 524/588, 838
See application file for complete search history.

(56) References Cited

U.S. PATENT DOCUMENTS

| | | | |
|---|---|---|---|
| 5,001,210 A | | 3/1991 | Coury et al. |
| 5,174,813 A | * | 12/1992 | Cifuentes et al. ............... 106/3 |
| 5,389,364 A | | 2/1995 | Cifuentes et al. |
| 5,399,652 A | * | 3/1995 | Bindl et al. .................... 528/26 |
| 5,686,547 A | | 11/1997 | Nye |
| 6,379,751 B1 | * | 4/2002 | Schafer et al. ............... 427/389 |
| 6,762,172 B1 | * | 7/2004 | Elfersy et al. ................. 514/63 |
| 2004/0110659 A1 | | 6/2004 | Herault et al. |

FOREIGN PATENT DOCUMENTS

DE 19756454 C1 6/1999

EP 0490402 A2 6/1992

OTHER PUBLICATIONS

English Abstract for EP0490402A2.

* cited by examiner

*Primary Examiner*—Margaret G Moore
(74) *Attorney, Agent, or Firm*—Brooks Kushman P.C.

(57) ABSTRACT

Organosilicon compounds containing urethane groups are prepared by reacting aminofunctional organosilicon compounds containing at least one siloxane unit $$AR_aSiO_{\frac{3-a}{2}} \quad (I)$$

per molecule and at least two siloxane units of the formula $$XR_bSiO_{\frac{3-b}{2}} \quad (II)$$

in which R are monovalent, optionally substituted $C_{1-18}$ hydrocarbon radicals,
A is a radical $$-R^1(-NR^2-R^1)_z-NR^2-H \quad (III),$$

where $R^1$ is a divalent $C_{1-18}$ organic radical, $R^2$ is a hydrogen atom or $C_{1-18}$ hydrocarbon radical, X is a group capable of condensation, a is 0 or 1, b is 1 or 2, z is 0 or an integer from 1 to 10, are reacted with organic carbonates (2) containing a group of the formula $$-O-C(=O)O- \quad (IV),$$

and, in a second stage, the first stage reaction products are optionally condensed with silanes (3) bearing groups capable of condensation, to give higher molecular weight organosilicon compounds containing urethane groups.

20 Claims, No Drawings

PROCESS FOR THE PREPARATION OF ORGANOSILICON COMPOUNDS HAVING URETHANE GROUPS

BACKGROUND OF THE INVENTION

1. Field of the Invention

The invention relates to a process for the preparation of organosilicon compounds containing urethane groups, and to organosilicon compounds having urethane groups prepared thereby.

2. Background Art

U.S. Pat. No. 5,001,210 A discloses the preparation of a polyurethane by a two-stage process. In a first stage, a diamine of the formula A-M-A, in which A is a terminal amino group and M is a radical desired to be introduced into the polyurethane, such as a hydrocarbon radical or a polymer radical, e.g. a dimethylpolysiloxane radical, is reacted with a cyclic carbonate to give a urethane diol. The polymer is then synthesized by reacting the urethane diol obtained in the first stage with a diisocyanate to obtain the desired polyurethane. A disadvantage is that the chain length achievable in the polymer synthesis is limited by impurities and inexact stoichiometry of the starting materials.

U.S. Pat. No. 6,379,751 A describes water repellents for the treatment of leather, wherein the water repellants, fixed with formic acid, have the same effectiveness as with conventional fixing with chromium salts. The water repellants described therein contain a polysiloxane which contains carboxyl groups and is prepared by reacting an aminopolysiloxane with a lactone or a cyclic carbonate, and the hydroxyl groups in the polysiloxane obtained in the reaction are then reacted with a polycarboxylic acid derivative. A further synthesis to give high molecular weight polymers is not described.

U.S. Pat. No. 5,174,813 and U.S. Pat. No. 5,389,364 disclose reaction products of linear aminopolysiloxanes with carbonates or lactones. The aminosiloxane derivatives are used in U.S. Pat. No. 5,174,813 without a further condensation process in polish formulations and in U.S. Pat. No. 5,389,364 in hair care compositions.

U.S. Pat. No. 5,686,547 describes a process for the preparation of silicones having hydroxycarbamate functional groups, in which hydrogensiloxanes are subjected to an addition reaction with unsaturated cyclic carbonate esters in a hydrosilylation reaction, to obtain silicones having carbonate functional groups which are subsequently reacted with organic amines such as dialkylamines. Aminopolysiloxanes are not used.

SUMMARY OF THE INVENTION

It was an object of the invention to provide a process for the preparation of organosilicon compounds containing urethane groups, in which the preparation of high molecular weight polymers is accomplished without the use of isocyanates; in which a multiplicity of aminopolysiloxanes which have amino side groups and whose chain length and functionality density are variable, can be used as starting materials; and in which the desired end products and the desired chain lengths of the end products are obtained in a simple manner, and easily varied. It was a further object of the invention to provide organosilicon compounds containing urethane groups, in particular high molecular weight polymers. These and other objects have been surprisingly met by first reacting amino-functional organosilicon compounds containing at least one siloxy moiety containing an organoamine group and at least two siloxy moieties containing a condensable group, with an organic carbonate, and in a subsequent reaction, the products are optionally condensed with silanes bearing condensable groups, to provide higher molecular weight polymers containing urethane groups.

DETAILED DESCRIPTION OF THE PREFERRED EMBODIMENT(S)

The invention thus relates to a process for the preparation of organosilicon compounds having urethane groups, in which, in a 1st stage, aminofunctional organosilicon compounds (1) which contain at least one siloxane unit of the general formula

$$AR_aSiO_{\frac{3-a}{2}} \qquad (I)$$

per molecule and at least two siloxane units of the general formula

$$XR_bSiO_{\frac{3-b}{2}} \qquad (II)$$

per molecule, in which

R each is identical or different and is a monovalent, optionally substituted hydrocarbon radical having 1 to 18 carbon atoms, preferably a monovalent hydrocarbon radical having 1 to 18 carbon atoms, A is a radical of the general formula

$$-R^1(-NR^2-R^1)_z-NR^2-H \qquad (III),$$

in which $R^1$ each independently is a divalent organic radical having 1 to 18 carbon atoms, preferably a divalent hydrocarbon radical having 1 to 18 carbon atoms, $R^2$ each independently is a hydrogen atom or a hydrocarbon radical having 1 to 18 carbon atoms, preferably a hydrogen atom, X is a group capable of condensation, a is 0 or 1, preferably 1, b is 1 or 2, preferably 2, z is 0 or an integer from 1 to 10, preferably 0, 1 or 2, are reacted with organic carbonates (2) which contain a group of the general formula

$$-O-C(=O)O- \qquad (IV)$$

and, in a 2nd stage, the reaction products of (1) and (2) which are obtained in the 1st stage and bear groups capable of condensation are optionally condensed with silanes (3), which bear groups capable of condensation, to give higher molecular weight organosilicon compounds containing urethane groups.

In the process of the invention, the condensation gives urethane group-containing organosilicon compounds in which the molecular weight $M_n$ is preferably at least twice as great, more preferably at least five times as great, as the molecular weight $M_n$ of the aminofunctional organosilicon compound (1).

Examples of hydrocarbon radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as the o-, m-, and p-tolyl radicals, xylyl radicals and ethylphenyl radicals; and aralkyl radicals such as the benzyl radical and the α- and the β-phenylethyl radicals.

Examples of substituted hydrocarbon radicals R are halogenated hydrocarbon radicals, while examples of radicals $R^1$ are alkylene radicals having 1 to 18 carbon atoms.

Examples of radicals A are —CH$_2$—NH$_2$, —CH(CH$_3$)—NH$_2$, —C(CH$_3$)$_2$—NH$_2$, —CH$_2$CH$_2$—NH$_2$, —CH$_2$CH$_2$CH$_2$—NH$_2$, —CH$_2$CH$_2$CH$_2$CH$_2$—NH$_2$, —CH$_2$CH$_2$CH(CH$_3$)—NH$_2$, —CH$_2$CH$_2$CH$_2$—NH—CH$_2$CH$_2$—NH$_2$, —CH$_2$CH$_2$CH$_2$—N(CH$_3$)—CH$_2$CH$_2$—NH$_2$, —CH$_2$CH$_2$CH$_2$[—NH—CH$_2$CH$_2$]$_2$—NH$_2$, —CH$_2$CH$_2$C(CH$_3$)$_2$CH$_2$—NH$_2$.

The organosilicon compounds (1) preferably contain siloxane units of the formula

$$R_cSiO_{\frac{4-c}{2}} \quad (V)$$

in which R has the meaning stated above therefor and c is 1, 2 or 3, in addition to the siloxane units of the formulae (I) and (II). Organosilicon compounds (1) are preferably linear or substantially linear organopolysiloxanes.

The organopolysiloxanes (1) must contain at least two reactive groups X, preferably at the chain ends, which are capable of undergoing condensation either with themselves or with reactive groups of silanes (3) with formation of covalent bonds to give higher molecular weight products. These are preferably groups which can be readily eliminated from the siloxy radical, such as hydroxyl, alkoxy, acyl or oxime groups, and also halogens, wherein hydroxyl and alkoxy groups, particularly methoxy and ethoxy groups, are preferred, and wherein the hydroxyl group is particularly preferred. Preferably, the hydroxyl group forms at least 50 mol % of all groups X capable of condensation in the organopolysiloxane (1), more preferably at least 90 mol %.

Preferred organosilicon compounds (1) are linear organopolysiloxanes of the general formula

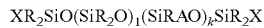

$$XR_2SiO(SiR_2O)_l(SiRAO)_kSiR_2X \quad (VI),$$

in which A, R and X have the meaning stated above therefor, l is 0 or an integer from 1 to 1000, preferably an integer from 10 to 600, and k is an integer from 5 to 1000, preferably an integer from 10 to 500, and more preferably an integer from 50 to 500.

In the context of this invention, formula (VI) is to be understood as meaning that l units of —(SiR$_2$O)— and k units of —(SiRAO)— can be distributed in any desired manner, for example as a block or randomly, in the organopolysiloxane molecule. However, it is also possible to use substantially linear organopolysiloxanes (1) which, in addition to the D units SiRAO and SiR$_{2O}$, may also contain T units SiAO$_{3/2}$ and/or SiRO$_{3/2}$.

The organosilicon compounds (1) used in the inventive process preferably have an average viscosity of from 50 to 50,000 mPa·s at 25° C., more preferably from 100 to 20,000 mPa·s at 25° C., and most preferably an average molecular weight M$_n$ of from 3000 to 80,000 Da, preferably from 5000 to 50,000 Da. The organosilicon compounds (1) contain primary and/or secondary amino groups in titratable amounts of from 0.01 to about 8 meq/g, more preferably in the range of from 0.05 to about 3 meq/g of organosilicon compound (1).

Examples of organopolysiloxanes (1) are copolymers comprising aminopropylmethylsiloxane and dimethylsiloxane units, aminopropylsiloxane and dimethylsiloxane units, aminoethylaminopropylmethylsiloxane and dimethylsiloxane units, and aminoisobutylmethylsiloxane and dimethylsiloxane units, and also terpolymers comprising aminopropylsiloxane, aminopropylmethylsiloxane and dimethylsiloxane units, or comprising aminopropylmethylsiloxane, aminoethylaminopropylsiloxane and dimethylsiloxane units.

It is possible to use one type of organosilicon compound (1) or a plurality of types of organosilicon compounds (1).

Cyclocarbonates of the general formula

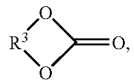

(VII)

in which $R^3$ is a divalent hydrocarbon radical having 1 to 12 carbon atoms optionally substituted by at least one hydroxyl group, preferably a divalent hydrocarbon radical having 1 to 6 carbon atoms optionally substituted by at least one hydroxyl group, are preferably used as organic carbonates (2). In this context, the radical $R^3$ is preferably an ethylene, propylene or hydroxymethylethylene radical.

Examples of organic carbonates (2) are dimethyl carbonate, diethyl carbonate, ethylene carbonate, propylene carbonate, butylene carbonate and glyceryl carbonate. These starting materials can be used individually or as mixture(s) with one another. Particularly in the case of ethylene carbonate, a mixture with a liquid carbonate is advisable so that it is not be used as a solid, with the result that handling is facilitated. Such mixtures are commercially available.

The carbonates (2) react preferentially with the primary amino groups of the organosilicon compounds (1). The stoichiometry of carbonate (2) to primary amine in (1) is not critical at all, and may vary within wide limits depending on the aim of the synthesis. Excess amine does, of course, lead to products which still contain free amino groups and which may therefore be protonated. Conversely, in the case of excess carbonate, the complete conversion of all primary amino groups is rapidly obtained. For economic reasons, however, a conversion which is substantially stoichiometric is desirable, as possible, with a carbonate/—NH$_2$ quotient of about 1.0. Thus, in the inventive process, carbonate (2) is preferably used in amounts of from 0.2 to 2 mol, preferably from 0.5 to 1.2 mol, per mole of primary and secondary amino group in organosilicon compound (1).

If the organopolysiloxanes (1) also contain secondary amino groups in addition to the primary amino groups, predominantly basic reaction products are obtained since the carbonates react only incompletely with secondary amino groups even when they are used in a relatively large excess, based on the amino groups.

The first stage of the process, the reaction of (1) with (2), is preferably carried out at a temperature of from 10° C. to 160° C. If the process is carried out discontinuously, for example, in a batch process, the temperature is preferably from 25° C. to 80° C., while the process is carried out continuously, the temperature is preferably from 100° C. to 160° C. It is also possible to use higher or lower temperatures, as well. The process is preferably carried out at atmospheric pressure, i.e. at about 1020 hPa, but may also be conducted at higher or lower pressures.

The preparation of the organosilicon compounds of the invention can be effected in organic solvents. Particularly in the case of organosilicon compounds having high viscosities, preparation in solution may be advantageous. Examples of suitable solvents include saturated hydrocarbons such as n-pentane, n-hexane, n-heptane and n-octane and the branched isomers thereof; naphthas, e.g. alkane mixtures having a boiling range of from 80° C. to 140° C. at 1020 hPa; unsaturated hydrocarbons such as 1-hexene, 1-heptene, 1-octene and 1-decene; aromatic hydrocarbons such as benzene, toluene and xylene(s), halogenated alkanes having 1 to 6 carbon atom(s), such as methylene chloride, trichloroethylene and perchloroethylene; ethers such as di-n-butyl-ether; esters such as ethyl acetate; ketones such as methyl ethyl ketone and cyclohexanone; alcohols such as methanol, ethanol, n-propanol and isopropanol; and low molecular weight linear and cyclic organopolysiloxanes.

The condensation of the reaction products of (1) and (2) to give the organosilicon compounds (4) can be effected according to conventional processes. If the organosilicon compound (1) contains, as reactive group X, a hydroxyl group or a mixture of hydroxyl and alkoxy groups, a condensation may be effected purely thermally, optionally with catalysis by acids or bases. Examples of acids are aliphatic or aromatic sulfonic acids, fluorocarboxylic acids or sulfuric acid, and examples of bases are potassium hydroxide, cesium hydroxide or sodium methylate. These examples are not limiting. If the organosilicon compound (1) contains exclusively groups which can be readily eliminated, such as alkoxy, acyl, oxime or halogen groups, and no hydroxyl groups, some of these groups are preferably first hydrolyzed by addition of water and only thereafter is the condensation process begun. Water is preferably used in amounts of from 1 to 10 mol per mole of hydrolyzable group X.

It is preferable that at least 50 mol % of the reactive groups X in the organosilicon compound (1) comprise hydroxyl groups. The condensation of exclusively Si—OH terminal groups with formation of a siloxane linkage and water is particularly preferred.

In the condensation of the 2nd stage of the process, silanes (3), preferably alkoxysilanes, can also be used. These act as condensation auxiliaries, and react with the preferred siloxane diols (the organopolysiloxanes (1) of the formula (VI) which have terminal hydroxyl groups) with formation of alcohols, and are themselves incorporated between the siloxane chains.

Particularly reactive α-silanes which contain the group Si—CH$_2$— heteroatom are preferably used for this purpose. α-Silanes of the general formula

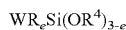  (VIII), in which W is a monovalent radical of the formula —CH$_2$—Y,

Y is a monofunctional radical from among the halogens, monosubstituted O and S atoms and substituted N and P atoms, R has the meaning given above, R$^4$ is an alkyl radical having 1 to 8 carbon atoms per radical, e is 0 or 1, preferably 1, are preferably used as silanes (3).

Silanes (3) are most preferably α-aminosilanes. W is therefore preferably a radical of the formula

in which R$^5$ is a monovalent hydrocarbon radical optionally containing N and/or O atoms and having 1 to 18 carbon atoms, and R$^6$ is a divalent hydrocarbon radical optionally containing N and/or O atoms and having 3 to 12 carbon atoms.

The alkoxy group —OR$^4$ in the α-silanes of the formula (VIII) is preferably a methoxy or ethoxy radical.

Preferred examples of radicals W are aminomethyl, methylaminomethyl, dimethylaminomethyl, diethylaminomethyl, dibutylaminomethyl, cyclohexylaminomethyl, anilinomethyl, 3-dimethylaminopropylaminomethyl, bis(3-dimethylaminopropyl)aminomethyl, N-morpholinomethyl, piperazinomethyl, piperidinomethyl, diethylphosphinomethyl, and dibutylphosphinomethyl.

For the formation of chain-like organopolysiloxane compounds (4), dialkoxysilanes which lead to a linear polymer structure are preferably used as silanes (3) in the second stage of the process. Of course, trialkoxysilanes lead to branches during condensation, and should therefore be used only in a small amount, if at all, if the preparation of uncrosslinked products (3) is intended. The use of monoalkoxysilanes for endcapping the polymer chains is also possible, but tends to be counterproductive in the synthesis of larger polymer molecules, since chain termination is produced thereby, thus limiting the molecular weight.

In the second stage of the process, silanes (3) are preferably used in amounts of from 0.5 to 2.0 mol, preferably from 0.9 to 1.5 mol, of alkoxy group —OR$^4$ in (3) per mole of groups X, which are preferably hydroxyl groups, in the reaction product of (1) and (2) obtained in the first stage. In order to achieve molecular weights which are as high as possible, a ratio of alkoxy group (3) to hydroxyl groups in the reaction product of (1) and (2) of about 1 is preferably maintained; in specific cases, however, the ratio may be different in view of alkoxy group losses which may occur as a result of secondary reactions owing to impurities such as water. If organopolysiloxanes (1) having higher molecular weights of from about 10,000 to 50,000 Dalton are used in the first stage of the process for reaction with (2), end product molecular weights of more than 100,000 Daltons can be achieved in a few condensation steps.

The condensation provides high molecular weight organosilicon compounds containing urethane groups, and having a molecular weight M$_n$ which is preferably at least twice, more preferably five times or more, as great as the molecular weight M$_n$ of the organosilicon compound (1). The condensation can also provide higher molecular weight organosilicon compounds containing urethane groups, and having a molecular weight M$_n$ which is preferably from 2 to 100 times, preferably from 5 to 50 times, as great as the molecular weight M$_n$ of the organosilicon compound (1) used.

In the case of a strictly linear condensation, i.e. if the reaction product of (1) and (2) contains exactly two groups X (hydroxyl) per molecule and the silane (3) is one of the formula (VIII) where e is 1, the molecular weight $M_n$ of the organosilicon compounds which is achieved on average in a loss-free condensation procedure is dependent only on the stoichiometry of the groups X to $OR^4$ and the completeness of the condensation reaction itself. If this takes place completely (i.e. 100%), which is possible with silanes of the formula (VIII), and if the $OH/OR^4$ ratio used is chosen to be 2.0, a product which has an $M_n$ which is twice that of the reaction product of (1) and (2), plus the weight of the silane of the formula (VIII), minus twice the weight of the cleavage product $R^4OH$, is obtained. Since the weights of silane (3) and $R^4OH$ are small compared with the weight of the reaction product of (1) and (2), approximately doubling of molecular weight has therefore been obtained. Analogously, an increase by a factor of approximately 10 is obtained when an $OH/OR^4$ ratio of 10:9 is used, and approximately an increase of the $M_n$ of the reaction product (1) and (2) by a factor of fifty is obtained in the case of an $OH/OR^4$ ratio of 50:49.

In the case of e=0, branched condensates are obtained. These are on average only slightly branched in the case of a high $OH/OR^4$ ratio, and more highly branched in the case of a smaller OH excess. As the $OH/OR^4$ ratio approaches 1, flowable products are no longer obtained: the organosiloxane according to the invention is then present as a gel and may have elastomeric properties. A meaningful molecular weight $M_n$ can no longer be stated for such products since this would assume extremely high values.

The condensation is preferably carried out at a temperature of from 10° C. to 150° C., more preferably from 25° C. to 120° C., and at atmospheric pressure, i.e. at about 1020 hPa, although it can also be carried out at higher or lower pressures.

In a special embodiment of the process according to the invention, it is also possible to carry out the reaction with the component (2) and the condensation simultaneously in one step.

The process according to the invention can be carried out batchwise, semi-continuously or continuously.

The inventive process has the advantage that functionalization of the polymers with urethane groups and chain synthesis of the polymers are decoupled, which makes the process very flexible. Depending on the amino group density of the organopolysiloxanes (1), the functionalization to give urethane groups, particularly with the commercially available cyclocarbonates (2), can be chosen to be high even in the first stage of the process, and the desired chain length can be obtained and varied in a simple manner by subsequent condensation. The process of the invention involves no isocyanates, which is an ecological advantage.

In the invention, organopolysiloxanes containing urethane groups are preferably obtained as organosilicon compounds having urethane groups. These may have linear, branched, cyclic or crosslinked structures. Linear or substantially linear organopolysiloxanes (4) are preferred.

The organosilicon compounds containing urethane groups are high molecular weight products and preferably have an average molecular weight $M_n$ of from 10,000 to 1,000,000 Da, preferably from 50,000 to 600,000 Da and most preferably from 100,000 to 300,000 Da.

In the process, organosilicon compounds (4) which have urethane groups and contain on average at least 5 siloxane units of the general formula

in which R and a have the meaning stated above therefor,

B is a radical of the general formula

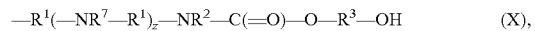

in which $R^1$, $R^2$, $R^3$ and z have the meaning stated above therefor, and $R^7$ is $R^2$ or a radical of the formula —C(=O)—O—$R^3$—OH, are preferably obtained.

The organosilicon compounds (4) having urethane groups preferably contain from 10 to 500, more preferably from 50 to 500, and most preferably from 100 to 500 siloxane units of the general formula (IX) bearing a radical B. Organosilicon compounds (4) which have urethane groups and, in addition to the siloxane units of the formula (IX), also contain siloxane units from the condensation with α-silanes, are preferably obtained.

The invention therefore relates to organosilicon compounds (4) which have urethane groups and contain on average at least five siloxane units of the general formula

in which R, B and a have the meaning stated above therefor, and at least one siloxane unit of the general formula

in which R, W and e have the meaning stated above therefor.

The organosilicon compounds (4) having urethane groups preferably contain from 2 to 100, preferably from 5 to 100, and most preferably from 5 to 50 siloxane units of the general formula (XI) with radical W.

The organosilicon compounds (4) preferably also contain siloxane units of the formula

in which R and c have the meaning stated above therefor, in addition to the siloxane units of the formulae (IX) and (XI).

Preferred organosilicon compounds (4) having urethane groups are those of the general formula

in which Q is R, X or a radical of the formula —$OR^4$,

R, $R^4$, B, X and W have the meaning stated above therefor, m is 0 or an integer from 1 to 1000, preferably from 10 to 600, n is an integer from 2 to 1000, preferably from 10 to 500, particularly preferably from 50 to 500, and o is an integer from 1 to 1000, preferably from 5 to 100.

In the context of this invention, formula (XIII) is to be understood as meaning that m units of —(SiR$_2$O)— and n units of —(SiRBO)— and o units of —(SiRWO)— can be distributed in any desired manner, for example as blocks or randomly, in the organopolkysiloxane molecule. The o units of —(SiRWO)— are preferably separated from one another predominantly by —(SiR$_2$O)— and —(SiRBO)— units. However, predominantly linear organopolysiloxanes (4) which, in addition to the D units SiRAO, SiR$_2$O and SiRWO, may also contain T units SiAO$_{3/2}$ and/or SiRO$_{3/2}$ and/or SiWO$_{3/2}$ may also be obtained.

The invention furthermore relates to emulsions containing:

(i) organosilicon compounds according to the invention having urethane groups, (ii) emulsifiers, and (iii) water.

The preparation of emulsions according to the invention is effected by thorough mixing of components (i), (ii) and (iii). Technologies for the preparation of emulsions of organopolysiloxanes are known. Thus, the thorough mixing can be effected in rotor-stator stirring apparatuses, colloid mills or high-pressure homogenizers.

In the case of the emulsions according to the invention, water is preferably used in amounts of from 60 to 400 parts by weight, more preferably from 80 to 300 parts by weight, based in each case on 100 parts by weight of (i) organosilicon compounds having urethane groups.

All ionic and nonionic emulsifiers, with which it is possible to prepare aqueous emulsions of organopolysiloxanes can be used as (ii) emulsifiers, both individually and as mixtures of different emulsifiers.

Examples of anionic emulsifiers are:

1. Alkyl sulfates, particularly those having a chain length of 8 to 18 carbon atoms, alkyl and alkaryl ether sulfates having 8 to 18 carbon atoms in the hydrophobic radical and 1 to 40 ethylene oxide (EO) or propylene oxide (PO) units.

2. Sulfonates, in particular alkane sulfonates having 8 to 18 carbon atoms, alkylaryl sulfonates having 8 to 18 carbon atoms, taurides, esters and monoesters of sulfosuccinic acid with monohydric alcohols or alkylphenols having 4 to 15 carbon atoms; these alcohols or alkylphenols may also optionally be ethoxylated with from 1 to 40 EO units.

3. Alkali metal and ammonium salts of carboxylic acids having 8 to 20 carbon atoms of the alkyl, aryl, alkaryl or aralkyl radical.

4. Partial esters of phosphoric acid and the alkali metal and ammonium salts thereof, in particular alkyl and alkaryl phosphates having 8 to 20 carbon atoms in the organic radical, alkyl ether phosphates or alkaryl ether phosphates having 8 to 20 carbon atoms in the alkyl or alkaryl radical and 1 to 40 EO units.

Examples of nonionic emulsifiers are:

5. Polyvinyl alcohol which still has from 5 to 50%, preferably from 8 to 20%, of vinyl acetate units, having a degree of polymerization of from 500 to 3000.

6. Alkylpolyglycol ethers, preferably those having 8 to 40 EO units and alkyl radicals of 8 to 20 carbon atoms.

7. Alkylaryl polyglycol ethers, preferably those having 8 to 40 EO units and 8 to 20 carbon atoms in the alkyl and aryl radicals.

8. Ethylene oxide/propylene oxide (EO/PO) block copolymers, preferably those having 8 to 40 EO or PO units.

9. Adducts of alkylamines having alkyl radicals of 8 to 22 carbon atoms with ethylene oxide or propylene oxide.

10. Fatty acids having 6 to 24 carbon atoms.

11. Alkylpolyglycosides of the general formula R*—O—Z$_O$, in which R* is a linear or branched, saturated or unsaturated alkyl radical having on average 8-24 carbon atoms and Z$_O$ is an oligoglycoside radical having on average o=1-10 hexose or pentose units or mixtures thereof.

12. Natural substances and derivatives thereof, such as lecithin, lanolin, saponins, cellulose; cellulose alkyl ethers and carboxyalkylcelluloses whose alkyl groups each have up to 4 carbon atoms.

13. Linear organo(poly)siloxanes containing polar groups, in particular those having alkoxy groups having up to 24 carbon atoms and/or up to 40 EO and/or PO groups.

Examples of cationic emulsifiers are:

14. Salts of primary, secondary and tertiary fatty amines having 8 to 24 carbon atoms with acetic acid, sulfuric acid, hydrochloric acid and phosphoric acids.

15. Quaternary alkylammonium and alkylbenzylammonium salts, in particular those whose alkyl groups have 6 to 24 carbon atoms, in particular the halides, sulfates, phosphates and acetates.

16. Alkylpyridinium, alkylimidazolinium and alkyloxazolinium salts, in particular those whose alkyl chain has up to 18 carbon atoms, especially the halides, sulfates, phosphates and acetates.

Particularly suitable ampholytic emulsifiers are:

17. Long-chain substituted amino acids, such as N-alkyldi(aminoethyl)glycine or N-alkyl-2-aminopropionic acid salts.

18. Betaines, such as N-(3-acylamidopropyl-N,N-dimethylammonium salts having a $C_8$-$C_{18}$-acyl radical and alkylimidazolinium betaines.

Preferred emulsifiers are nonionic emulsifiers, in particular the alkyl polyglycol ethers mentioned above under 6.

The (ii) emulsifiers are preferably used in amounts of from 5 to 50 parts by weight, more preferably from 10 to 30 parts by weight, based in each case on 100 parts by weight of (i) organosilicon compounds having urethane groups.

EXAMPLE 1

200 g of a copolymer consisting of aminopropylmethylsiloxane and dimethylsiloxane units with an amino group concentration of 0.14 meq/g, and a molecular weight of $M_n$=32,000, exclusively having terminal hydroxyl groups, are dissolved in 150 g of toluene and 50 g of isopropanol. The solution thus contains 28 meq of primary amino groups and 12.5 meq of silanol groups. 2.50 g of ethylene carbonate, homogenized with stirring and heated to 50° C., are added to this solution, whereupon the viscosity of the solution increases. After 3 hours, titration for free amine gives a base concentration of less than 0.001 meq/g of solution, thus the primary amino groups have been converted virtually quantitatively into urethane groups.

0.80 g of cyclohexylaminomethyl-methyldiethoxysilane is added at 25° C. to 201.2 g of the solution previously obtained, homogenization is effected, and gentle stirring is carried out for 24 hours without heating. A highly viscous siloxane polymer solution which, after removal of solvent gives a siloxane polymer which is no longer flowable, is obtained. The polymer obtained contains an average of 54 siloxane units having urethane groups and 11 silxoane units having cyclohexylaminomethyl groups, with a molecular weight $M_n$ of about 350,000.

EXAMPLE 2

200 g of a copolymer consisting of aminopropylmethylsiloxane and dimethylsiloxane units with a concentration of 0.64 meq of —NH$_2$/g, 1090 ppm by weight of OH as silanol, and a molecular weight of M$_n$=31,000 are dissolved in a solvent mixture comprising 100 g each of toluene and isopropanol. 13.2 g of propylene carbonate are added to this solution and the reaction is allowed to continue to completion for 5 hours at 60° C. with stirring. A sample of the viscous solution shows an amine content of 0.002 meq/g, which corresponds to a conversion of more than 99%.

Thereafter, 206.6 g of the solution and 0.75 g of morpholinomethylmethyldiethoxysilane are homogenized by thorough stirring at 25° C., whereupon the viscosity of the solution increases greatly. A dried sample gives a clear solid polymer which initially swells with 10 times the amount of toluene and isopropanol and gives a clear solution again after 10 days. The polymer obtained contains on average 310 siloxane units having urethane groups and 15 siloxane units having morpholinomethyl groups, with a molecular weight M$_n$ is about 490,000.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the preparation of organosilicon compounds containing urethane groups, comprising reacting in a 1st stage, aminofunctional organosilicon compounds (1) which contain at least one siloxane unit of the formula $$AR_aSiO_{\frac{3-a}{2}} \quad (I)$$

per molecule and at least two siloxane units of the formula $$XR_bSiO_{\frac{3-b}{2}} \quad (II)$$

per molecule, in which
R are identical or different and are monovalent, optionally substituted hydrocarbon radicals having 1 to 18 carbon atoms,
A is a radical of the formula $$-R^1(-NR^2-R^1)_z-NR^2-H \quad (III),$$

in which
R$^1$ is a divalent organic radical having 1 to 18 carbon atoms,
R$^2$ is a hydrogen atom or a hydrocarbon radical having 1 to 18 carbon atoms,
X is a group capable of condensation,
a is 0 or 1,
b is 1 or 2,
z is 0 or an integer from 1 to 10;
with organic carbonates (2) which contain a group of the general formula $$-O-C(=O)O- \quad (IV)$$

and,
in a 2nd stage,
condensing the reaction products of (1) and (2) which are obtained in the 1st stage and have groups capable of condensation,
with silanes (3) which have groups capable of condensation, wherein silanes (3) are α-silanes of the formula $$WR_eSi(OR^4)_{3-e} \quad (VIII),$$

in which W is a monovalent radical of the formula —CH$_2$—Y,
Y is a monofunctional radical selected from the group consisting of the halogens, monosubstituted O and S atoms, and substituted N and P atoms,
R$^4$ is an alkyl radical having 1 to 8 carbon atoms per radical, and
e is 0 or 1,
to give higher molecular weight organosilicon compounds containing urethane groups.

2. The process of claim 1, wherein a is 1 and b is 2.
3. The process of claim 1, wherein R$^2$ is a hydrogen atom.
4. The process of claim 1, wherein A is an aminopropyl radical.
5. The process of claim 1, wherein X is a hydroxyl group.
6. The process of claim 1, wherein organosilicon compounds (1) comprise organopolysiloxanes of the general formula $$XR_2SiO(SiR_2O)_l(SiRAO)_kSiR_2X \quad (VI),$$

in which l is 0 or an integer of from 1 to 1000, and
k is an integer from 5 to 1000.
7. The process of claim 1, wherein carbonates (2) are cyclocarbonates of the formula

(VII)

in which R$^3$ is a divalent hydrocarbon radical having 1 to 12 carbon atoms which is optionally substituted by at least one hydroxyl group.

8. The process of claim 1, wherein carbonates (2) are cyclocarbonates selected from the group consisting of ethylene carbonate, propylene carbonate, and mixtures thereof.
9. The process of claim 1, wherein R$^4$ is methyl or ethyl and e is 1.
10. The process of claim 1, wherein W is a radical of the formula —CH$_2$NHR$^5$, —CH$_2$NR$^5_2$ or —CH$_2$NR$^6$ in which R$^5$ is a monovalent hydrocarbon radical optionally containing N and/or O atoms and having 1 to 18 carbon atoms, and R$^6$ is a divalent hydrocarbon radical optionally containing N and/or O atoms and having 3 to 12 carbon atoms.

11. The process of claim 1, wherein W is a cyclohexylaminomethyl or morpholinomethyl radical.
12. The process of claim 1, wherein the organosilicon compounds containing urethane groups are linear polymers.
13. An emulsion containing
(i) organosilicon compounds having urethane groups, prepared by the process of claim 1,
(ii) at least one emulsifier, and
(iii) water.

14. An organosilicon compound (4) which contains urethane groups and contains on average at least five siloxane units of the formula $$BR_aSiO_{\frac{3-a}{2}}, \quad (IX)$$

and on average at least one siloxane unit of the formula $$WR_eSiO_{\frac{3-e}{2}}, \quad (XI)$$

in which
B is a radical of the general formula

—R¹(—NR⁷—R¹)$_z$—NR²—C(=O)—O—R³—OH    (X),

R are identical or different and are monovalent, optionally substituted hydrocarbon radicals having 1 to 18 carbon atoms,
R¹ is a divalent organic radical having 1 to 18 carbon atoms,
R² is a hydrogen atom or a hydrocarbon radical having 1 to 18 carbon atoms,
R³ is a divalent hydrocarbon radical having 1 to 12 carbon atoms, optionally substituted by one or more hydroxyl groups,
R⁷ is R² or a radical of the formula —C(=O)—O—R³—OH,
W is a monovalent radical of the formula —CH₂—Y,
Y is a monofunctional radical selected from the group consisting of the halogens, monosubstituted O and S atoms, and substituted N and P atoms,
a is 0 or 1,
z is 0 or an integer from 1 to 10, and
e is 0 or 1.

15. An organosilicon compound (4) containing urethane groups of claim 14, which has a number average molecular weight $M_n$ which is at least 5 times as great as the number average molecular weight $M_n$ of an organosilicon compound (1) used as a starting or intermediate compound, wherein the organosilicon compound (1) is an aminofunctional organosilicon compound which contain at least one siloxane unit of the formula $$AR_aSiO_{\frac{3-a}{2}} \quad (I)$$

per molecule and at least two siloxane units of the formula $$XR_bSiO_{\frac{3-b}{2}} \quad (II)$$

per molecule, in which
R are identical or different and are monovalent, optionally substituted hydrocarbon radicals having 1 to 18 carbon atoms,
A is a radical of the formula —R¹(—NR²—R')$_z$—NR²—H    (III), in which
R¹ is a divalent organic radical having 1 to 18 carbon atoms,
R² is a hydrogen atom or a hydrocarbon radical having 1 to 18 carbon atoms,
X is a group capable of condensation,
a is 0 or 1,
b is 1 or 2, and
z is 0 or an integer from 1 to 10.

16. An organosilicon compound (4) containing urethane groups of claim 14, which has a number average molecular weight $M_n$ of from 10,000 to 1,000,000.

17. An organosilicon compound (4) of claim 14 containing urethane groups, wherein R² is a hydrogen atom.

18. An organosilicon compound (4) of claim 14 containing urethane groups, wherein R³ is an ethylene or propylene radical.

19. The organosilicon compound (4) of claim 14 containing urethane groups, wherein W is a radical of the formula —CH₂NHR⁵, —CH₂NR⁵₂ or —CH₂NR⁶ in which R⁵ is a monovalent hydrocarbon radical optionally containing N and/or O atoms and having 1 to 18 carbon atoms, and R⁶ is a divalent hydrocarbon radical optionally containing N and/or O atoms and having 3 to 12 carbon atoms.

20. The organosilicon compound (4) of claim 14 containing urethane groups, which is an organopolysiloxane of the general formula QR₂SiO(SiR₂O)$_m$(SiRBO)$_n$(SiRWO)$_o$SiR₂Q    (XIII)

in which Q is R, X or a radical of the formula —OR⁴,
R⁷ is R² or a radical of the formula —C(=O)—O—R³—OH,
B is a radical of the general formula —R¹(—NR⁷—R¹)$_z$—NR²—C(=O)—O—R³—OH,
in which W is a monovalent radical of the formula —CH₂—Y
X is a group capable of condensation, and
R⁴ is an alkyl radical having 1 to 8 carbon atoms per radical,
m is 0 or an integer from 1 to 1000,
n is an integer from 5 to 1000, and
o is an integer from 1 to 1000.

* * * * *